V. FAVIER.
THRASHING-MACHINE.

No. 176,463. Patented April 25, 1876.

Witnesses
Henri Guillaume
Chas. Jacobsen

Inventor
Victor Favier
by Henry Orth

UNITED STATES PATENT OFFICE.

VICTOR FAVIER, OF PERWEZ, BELGIUM.

IMPROVEMENT IN THRASHING-MACHINES.

Specification forming part of Letters Patent No. 176,463, dated April 25, 1876; application filed August 30, 1875.

*To all whom it may concern:*

Be it known that I, VICTOR FAVIER, of the city of Perwez, in the Province of Brabant and Kingdom of Belgium, have invented new and useful Improvements in Beaters for Thrashing-Machines, of which the following is a specification:

My invention consists in constructing the beaters in such a manner as to shake the ears of the grain violently to and fro in a rapid manner without bruising or crushing such grain or the straw, and so arranged that the ear and but a small portion of the straw of the grain are exposed to the action of the beaters. To effect this I construct the beaters of elliptical form in cross-section covered with zinc, sheet-iron, or other suitable material, thereby giving them a smooth surface.

Figure 1:
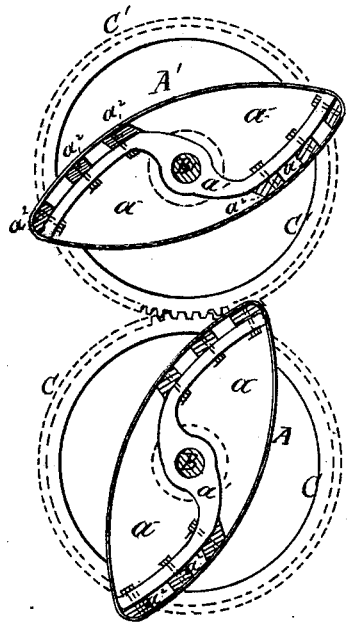
Figure 3:
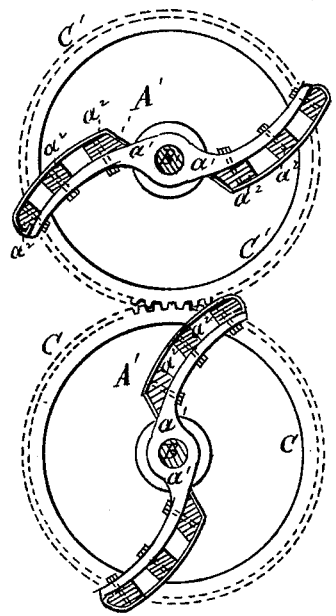
Figure 2:
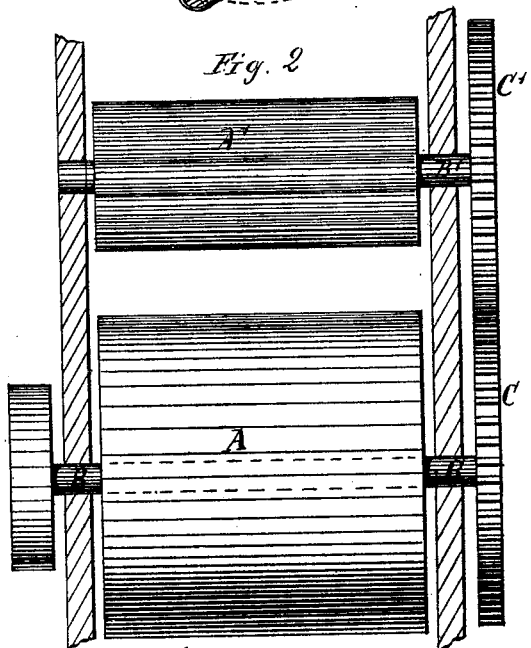
Figure 4:
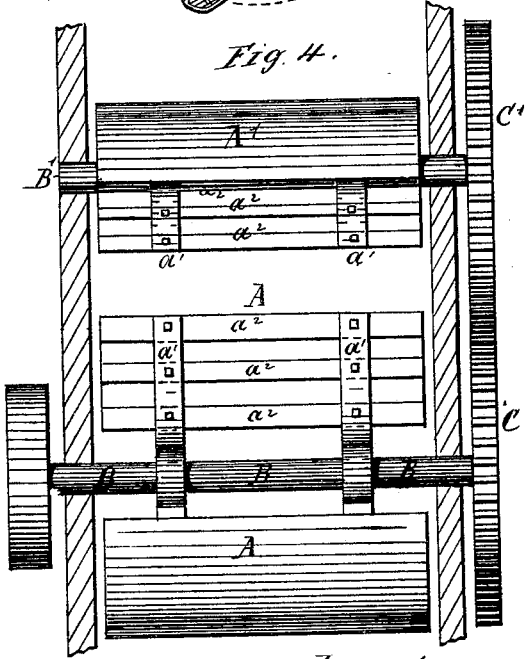

In the accompanying drawings, Figure 1 is a vertical transverse section of two beaters constructed according to my invention. Fig. 2 is a side elevation of the same, and Figs. 3 and 4 are similar views to Figs. 1 and 2 of a slight modification of the same.

A A' are the beaters, consisting of the two end pieces $a$, and one or more inner arms, $a^1$, connected together by transverse bars or braces $a^2$, bolted or otherwise affixed to the arms $a^1$ and end pieces $a^2$, the whole being covered with zinc or sheet-iron, or other suitable material. The end pieces and arms are of elliptical form, or of such a form that when the frame is covered the beaters are elliptical in cross-section. The end pieces $a$ and arms $a^1$ have apertures formed in their centers for the purpose of mounting them upon the shafts B B', to which they are rigidly bolted or otherwise affixed. The beaters A A' are mounted upon the shafts B B' in such a manner that when the beater A is in a vertical position the beater A' will be in a horizontal position, and vice versa, during their revolution. The shafts B B' carry each a cog-wheel, C C', of equal diameter, and having each an equal number of teeth or cogs. These two wheels C C' mesh into each other, thus connecting the two beaters A A' together.

I prefer to use cog-wheels of such a size and having a sufficient number of teeth to impart to the beaters A A' from four hundred to four hundred and fifty revolutions per minute, according to the nature of the grain to be thrashed.

Power is applied to the beaters A A' from any desired and suitable motor by means of a pulley carried by one of the shafts B B'. The grain to be thrashed is presented to the action of the beaters in such a manner that the ears and a very small portion of the straw or stalk only are subjected to the shaking or whipping action of the beaters A A'. From four to five inches are found to be sufficient. The action upon the grain by the beaters A A' is very effective, as with a speed of four hundred revolutions per minute the ears are subjected to a violent reciprocating shaking sixteen hundred times, the ears being whipped up and down against the beaters without either crushing or bruising the the grain or breaking the stalks or straw. The surface of the beaters being very smooth the dragging or sucking in of the straw is also obviated, and the beaters A A' acting only on the ears of the grain a great saving of power is effected while the grain is thoroughly and effectually shaken out of the ears.

Instead of constructing the beaters A A' as described above they may be arranged and constructed as shown by Figs. 3 and 4, in which $a^1 a^1$ are the arms of the form, as shown, having their centers enlarged and provided with apertures for the purpose of mounting them upon the shafts B B'. The arms $a^1$ are connected together by transverse bars or braces $a^2$, and are covered by zinc or sheet-iron, or other suitable material, on one side only, as shown. Thus, instead of forming a perfect ellipse in cross-section, which would be the case when entirely covered by the sheet metal, they form four beaters, the operation and action of which are similar to the two beaters A A', above described.

Having described my invention, what I claim, and desire to secure by Letters Patent, is—

In a thrashing-machine, the combination of two beaters, A A', arranged to operate as described, and having smooth convex surfaces for operating upon the grain, substantially as and for the purposes specified.

In testimony that I claim the foregoing I have hereunto set my hand.

V. FAVIER.

In presence of—
  JNO. WILSON,
  CUMTAVE DAWS.